(12) United States Patent
Sim

(10) Patent No.: US 9,424,661 B2
(45) Date of Patent: Aug. 23, 2016

(54) METHOD AND AN APPARATUS FOR FACILITATING EFFICIENT INFORMATION CODING

(75) Inventor: Wong Hoo Sim, Singapore (SG)

(73) Assignee: Creative Technology Ltd, Singapore (SG)

( * ) Notice: Subject to any disclaimer, the term of this patent is extended or adjusted under 35 U.S.C. 154(b) by 357 days.

(21) Appl. No.: 14/003,230

(22) PCT Filed: Feb. 22, 2012

(86) PCT No.: PCT/SG2012/000053
§ 371 (c)(1),
(2), (4) Date: Sep. 4, 2013

(87) PCT Pub. No.: WO2012/121667
PCT Pub. Date: Sep. 13, 2012

(65) Prior Publication Data
US 2013/0342543 A1    Dec. 26, 2013

(30) Foreign Application Priority Data

Mar. 4, 2011   (SG) ............................... 201101592-2

(51) Int. Cl.
*G06T 11/20* (2006.01)
*G06T 9/00* (2006.01)
*G06K 19/06* (2006.01)

(52) U.S. Cl.
CPC ........... *G06T 9/00* (2013.01); *G06K 19/06037* (2013.01)

(58) Field of Classification Search
None
See application file for complete search history.

(56) References Cited

U.S. PATENT DOCUMENTS

2014/0284385 A1* 9/2014 Decoux ............ G06K 19/06046
235/462.11

OTHER PUBLICATIONS

Catherine Rees, Written Opinion of the International Searching Authority, PCT/SG2012/000053, Mar. 26, 2012.

* cited by examiner

*Primary Examiner* — Peter Hoang
(74) *Attorney, Agent, or Firm* — Russell Swerdon; Desmund Gean

(57) ABSTRACT

A method and an apparatus for producing a coded graphic representation. The method includes providing a graphic array and processing at least a portion of the graphic array. A graphic array can be provided such that an array of graphic indications which includes a plurality of graphic indication pairs can be provided. Each of the plurality of graphic indication pair can have at least a first graphic element and a second graphic element. The first and second graphic element can be spaced apart such that each of the plurality of graphic indication pairs can be associated with an element pitch. The element pitches of the plurality of graphic indication pairs can be substantially similar. At least a portion of the graphic array can be processed by displacing at least one graphic indication pair in the plurality of graphic indication pairs such that at least one element pitch is deviated.

20 Claims, 9 Drawing Sheets

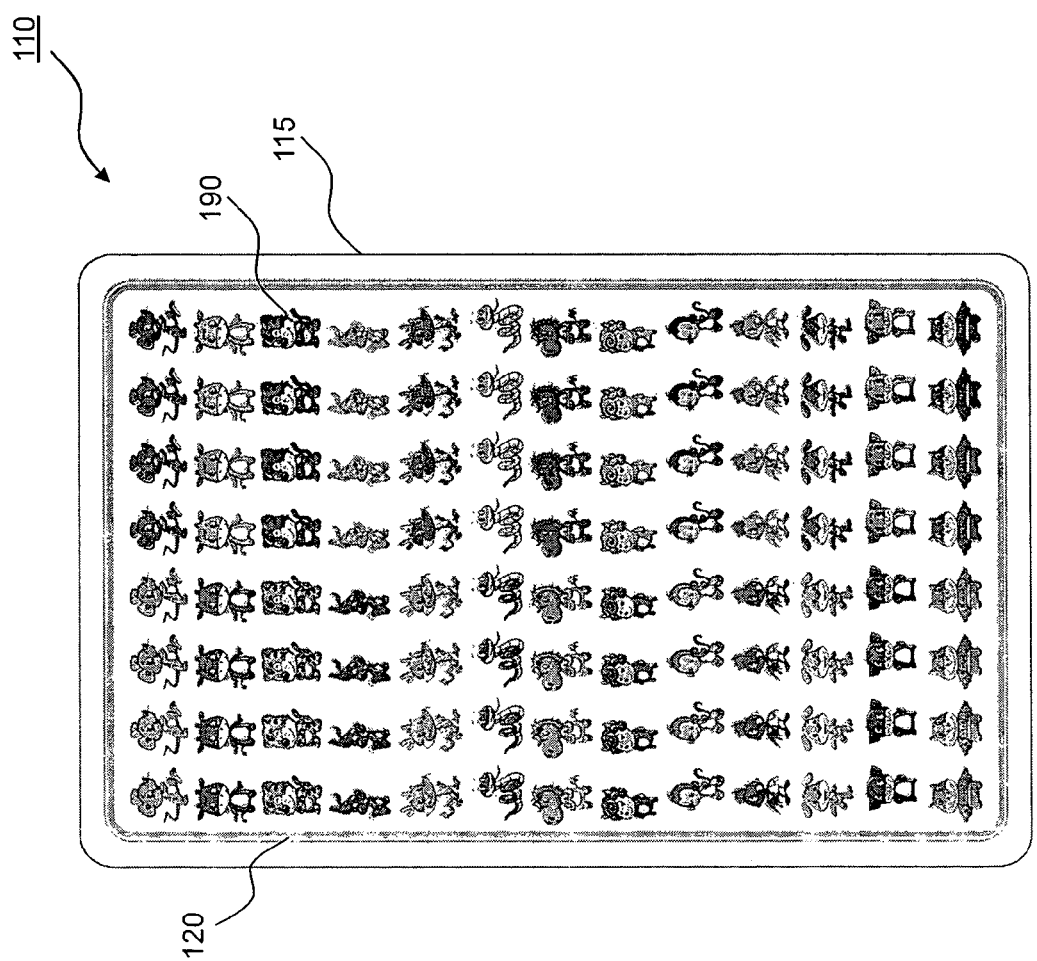

METHOD AND AN APPARATUS FOR FACILITATING EFFICIENT INFORMATION CODING

FIELD OF INVENTION

The present disclosure generally relates to information coding. More particularly, various embodiments of the disclosure relate to a method and an apparatus for producing a coded graphic representation in a manner so as to facilitate efficient information coding.

BACKGROUND

Coding of information may sometimes be necessary so that only appropriate or authorized people can access or consume the information.

Convention techniques for information coding can include graphic marking. For example in graphic marking, distinguishing marks can be included a picture. The distinguishing marks included can signify or be indicative of an intended message. Based on the distinguishing marks, the intended message can be conveyed to an authorized person.

However, such graphic marking generally requires altering an original picture in a manner so as to include the distinguishing marks. Hence an authorized person may need to reference a graphically marked picture with the original picture so as to identify the distinguishing marks.

Moreover, such distinguishing marks are generally subtle so that they are not easily perceived by any unintended recipients other than an authorized person. Thus identification of subtle distinguishing marks can be a tedious exercise for an authorized person.

As such, conventional techniques may not be capable of information coding in a suitably efficient manner.

It is therefore desirable to provide a solution to address at least one of the foregoing problems of conventional techniques.

SUMMARY OF THE INVENTION

In accordance with one aspect of the disclosure, a method for producing a coded graphic representation is provided. The method includes providing a graphic array and processing at least a portion of the graphic array.

A graphic array can be provided such that an array of graphic indications which includes a plurality of graphic indication pairs can be provided. Each of the plurality of graphic indication pair can have at least a first graphic element and a second graphic element.

The first and second graphic element can be spaced apart such that each of the plurality of graphic indication pairs can be associated with an element pitch. The element pitches of the plurality of graphic indication pairs can be substantially similar.

At least a portion of the graphic array can be processed by displacing at least one graphic indication pair in the plurality of graphic indication pairs such that at least one element pitch is deviated.

In accordance with another aspect of the disclosure, a recording medium carrying a coded graphic representation is provided. The coded graphic representation includes an array of graphic indications.

The array of graphic indications includes a plurality of graphic indication pairs presentable in a manner such that the array of graphic indications is in a form of an array having at least one of a plurality of rows and a plurality of columns.

Each of the plurality of rows and each of the plurality of columns can include a plurality of graphic indication pairs.

One graphic indication pair and another graphic indication pair of the plurality of graphic indication pairs in each of the plurality of rows can be spaced apart such that separation of graphic indication pairs in each of the plurality of rows can be associated with a first separation pitch.

Additionally, one graphic indication pair and another graphic indication pair of the plurality of graphic indication pairs in each of the plurality of columns can be spaced apart such that separation of graphic indication pairs in each of the plurality of columns can be associated with a second separation pitch.

Furthermore, each of the plurality of graphic indication pairs can include a first graphic element and a second graphic element.

The first and second graphic elements can be spaced apart such that each of the plurality of graphic indication pairs can be associated with an element pitch. The element pitches of the plurality of graphic indication pairs can be substantially similar At least one graphic indication pair in the plurality of graphic indication pairs can be displaced such that at least one element pitch is deviated.

In accordance with yet another aspect of the disclosure, an apparatus for producing a coded graphic representation is provided. The apparatus includes an input portion and a processing portion. The input portion can be coupled to the processing portion.

The input portion can be operated in a manner so as to communicate input signals and the processing portion can be configured to receive and process the input signals in a manner so as to produce graphic signals corresponding to the coded graphic representation.

The coded graphic representation includes an array of graphic indications. The array of graphic indications can include a plurality of graphic indication pairs which can be presented in a manner such that the array of graphic indications is in a form of an array having at least one of a plurality of rows and a plurality of columns.

Each of the plurality of rows and each of the plurality of columns can include a plurality of graphic indication pairs.

One graphic indication pair and another graphic indication pair of the plurality of graphic indication pairs in each of the plurality of rows can be spaced apart such that separation of graphic-indication pairs in each of the plurality of rows can be associated with a first separation pitch.

Additionally, one graphic indication pair and another graphic indication pair of the plurality of graphic indication pairs in each of the plurality of columns can be spaced apart such that separation of graphic indication pairs in each of the plurality of columns can be associated with a second separation pitch.

Additionally, each of the plurality of graphic indication pairs can include a first graphic element and a second graphic element. The first and second graphic element can be spaced apart such that each of the plurality of graphic indication pairs can be associated with an element pitch. The element pitches of the plurality of graphic indication pairs can be substantially similar.

The processing portion can be further configured to process the input signals in a manner such that at least one graphic indication pair in the plurality of graphic indication pairs is displaced such that at least one element pitch is deviated.

BRIEF DESCRIPTION OF THE DRAWINGS

Embodiments of the disclosure are described hereinafter with reference to the following drawings, in which:

FIG. 1b shows an alternative presentation of the coded graphic representation of FIG. 1a where each graphic indication pair in the array of graphic indications can be graphically represented via cartoon characters;

DETAILED DESCRIPTION

Representative embodiments of the disclosure, for addressing one or more of the foregoing problems associated with conventional techniques, are described hereinafter with reference to FIG. 1 to FIG. 4.

Figure 1A:
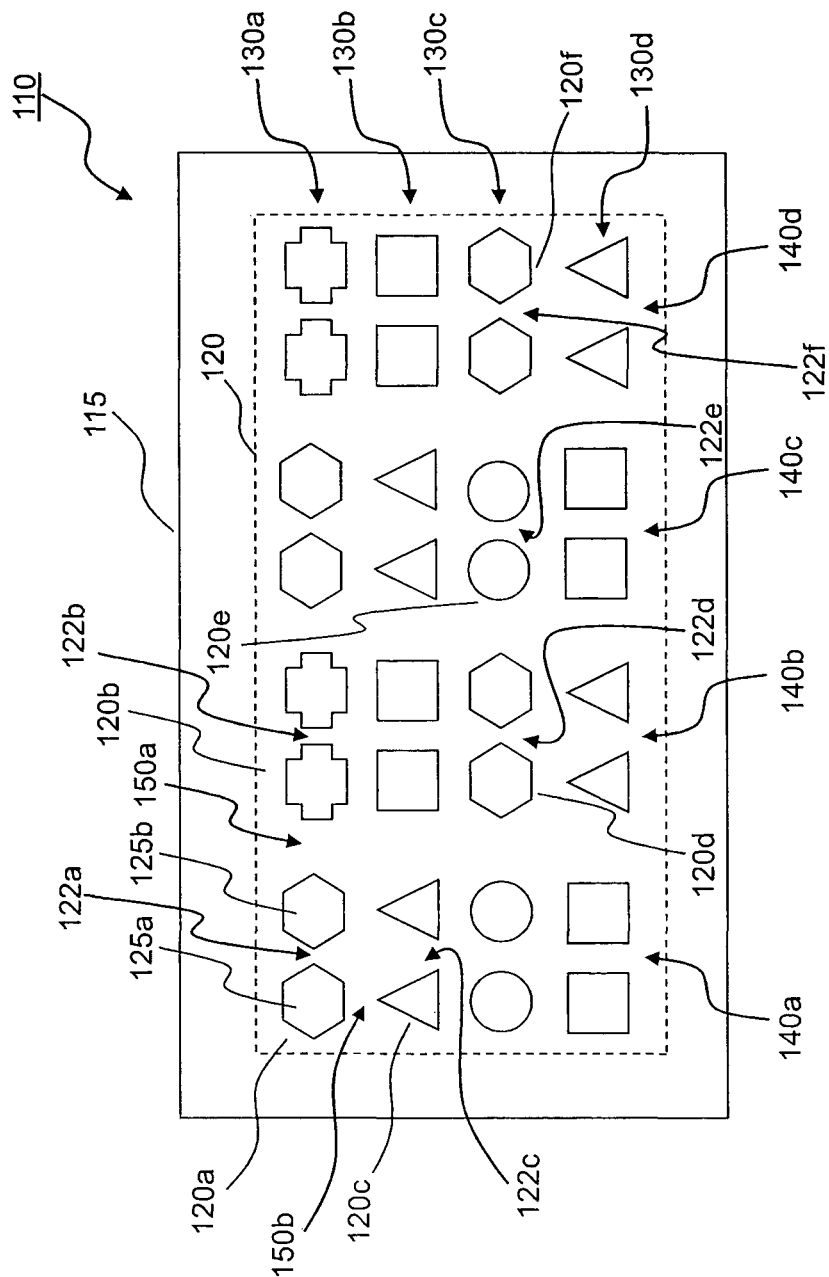
FIG. 1a shows a coded graphic representation which includes an array of graphic indications and which can be recorded on a recording medium, according to an embodiment of the disclosure.

FIG. 1a shows a coded graphic representation 110, in accordance with an embodiment of the disclosure. The coded graphic representation 110 can be rendered in various manners. In one example, the coded graphic representation 110 can be rendered in a digitized manner. In another example, the coded graphic representation 110 can be rendered in a non-digitized manner. When rendered in a digitized manner, the coded graphic representation 110 can, for example, be in a form of digital data which can be displayed as graphic data on a display screen. When rendered in a non-digitized manner, the coded graphic representation 110 can, for example be printed on a printing material such as a piece of paper or a piece of card.

The coded graphic representation 110 can be recorded on a recording medium 115. In one example, when digitally rendered, digital data corresponding to the coded graphic representation 110 can be recorded in a digital storage medium such as a hard disk. Thus the recording medium 115 can, for example, correspond to the digital storage medium. In another example, when rendered in a non-digitized manner, the coded graphic representation 110 can be recorded, via printing, on a printing material such as a piece of card. Thus the recording medium 115 can, for example, correspond to the printing material.

As shown, the coded graphic representation 110 can include an array of graphic indications 120. The array of graphic indications 120 can include a plurality of graphic indication pairs. Each of the graphic indication pairs in the plurality of graphic indication pairs can include a first graphic element 125a and a second graphic element 125b. The first graphic element 125a can be substantially similar to the second graphic element 125b. Additionally, the first and second graphic elements 125a/125b can be spaced apart such that there can be separation distance therebetween. The separation distance between the first and second graphic elements 125a/125b can correspond to element pitch. Appreciably, each graphic indication pair of the plurality of graphic indication pairs can thus be associated with an element pitch. The element pitches of the plurality of graphic indication pairs can be substantially similar.

More specifically, the array of graphic indications 120 can include a plurality of graphic indication pairs which can be presented in a manner such that the array of graphic indications 120 can be in the form of an array having one or more rows and one or more columns.

For example, the plurality of graphic indication pairs can be presented in a four by four array having a first row 130a, a second row 130b, a third row 130c, a fourth row 130d, a first column 140a, a second column 140b, a third column 140c and a fourth column 140d. In this regard, the plurality of graphic indication pairs can include sixteen graphic indication pairs presented in a four row by four column array. The sixteen graphic indication pairs can include a first indication pair 120a, a second indication pair 120b, a third indication pair 120c, a fourth indication pair 120d, a fifth indication pair 120e and a sixth indication pair 120f. The first indication pair 120a can be associated with a first element pitch 122a. The second indication pair 120b can be associated with a second element pitch 122b. The third indication pair 120c can be associated with a third element pitch 122c. The fourth indication pair 120d can be associated with a fourth element pitch 122d. The fifth indication pair 120e can be associated with a fifth element pitch 122e. The sixth indication pair 120f can be associated with a sixth element pitch 122f.

As mentioned earlier, the element pitches of the plurality of graphic indication pairs can be substantially similar. For example, the first to fourth element pitches 122a/122b/122c/122d can be substantially similar.

Furthermore the graphic indication pairs can be separated from each other such that there is separation distance therebetween. Particularly, one graphic indication pair and another graphic indication pair can be spaced apart such that there is separation distance therebetween.

For example, the first indication pair 120a, which can be located at the first row 130a and first column 140a, can be separated from the second indication pair 120b, which can be located at the first row 130a and the second column 140b, such that there is a first separation distance therebetween. Additionally, the first indication pair 120a can be separated from the third indication pair 120c, which can be located at the second row 130b and the first column 140a, such that there is a second separation distance therebetween.

In one embodiment, the first and second separation distances can be substantially similar in distance. In another embodiment, the first separation distance can be smaller in distance relative to the second separation distance. In yet another embodiment, the first separation distance can be larger in distance relative to the second separation distance.

The first separation distance and the second separation distance can correspond to a first separation pitch 150a and a second separation pitch 150b respectively. Thus separation of graphic indication pairs in each row of the first to fourth rows 130a/130b/130c/130d can generally be associated with the first separation pitch 150a whereas separation of graphic indication pairs in each column of the first to fourth columns 140a/140b/140c/140d can generally be associated with the second separation pitch 150b.

Additionally, the aforementioned element pitch can, in one embodiment, be substantially similar in distance with respect to the first and second separation distances. The aforementioned element pitch can, in another embodiment, be smaller in distance relative to one or both of the first and second separation distances. The aforementioned element pitch can, in yet another embodiment, be larger in distance relative to one or both of the first and second separation distances.

In one embodiment, either the first graphic element 125a or second graphic element 125b of a graphic indication pair in the plurality of graphic indication pairs can be position shifted such that the element pitch associated with the graphic indication pair can be deviated in a manner such that it is one of smaller and larger compared to the element pitches associated with the remaining graphic indication pairs of the plurality of graphic indication pairs. Furthermore, the element pitches associated with the remaining graphic indication pairs of the plurality of graphic indication pairs can be substantially similar. In this regard, the graphic indication pair which associated element pitch is deviated, can correspond to a position shifted graphic indication pair. In this manner, a position shifted graphic indication pair can thus be displaced with respect to the remaining graphic indication pairs of the array of graphic indications 120.

For example, either the first graphic element 125a or second graphic element 125b of the fifth indication pair 120e can be position shifted such that the fifth element pitch 122e is deviated. More specifically, the fifth element pitch 122e can be deviated such that it is one of larger and smaller compared to each of the first, second, third, fourth and sixth element pitches 122a/122b/122c/122d/122f. The first, second, third, fourth and sixth element pitches 122a/122b/122c/122d/122f can be substantially similar. In this regard, the fifth indication pair 120e can correspond to the aforementioned position shifted indication pair.

Therefore, by deviating element pitch associated with at least one indication pair relative to element pitches associated with the remaining indication pairs in the array of graphic indications 120, the coded graphic representation 110 can be produced.

The coded graphic representation 110 can be viewed by a viewer in a manner analogous to viewing of a stereogram. Thus a viewer viewing the coded graphic representation 110 can be capable of perceiving a distinctive indicator associated with a displaced indication pair. The distinctive indicator can correspond to a perceived elevation of one of the first and second graphic elements 125a/125b of a position shifted indication pair such as the fifth indication pair 120e. In this regard, the remaining indication pairs can be perceived to be recessed, relative to the distinctive indicator. In this manner, a viewer viewing the coded graphic representation 110 can perceive a three-dimensional (3-D) graphic effect where the distinctive indicator can generally be perceived to be elevated from the remaining indication pairs of the array of graphic indications 120.

It is appreciable that more than one indication pairs can be displaced or position shifted relative to the remaining indication pairs of the array of graphic indications 120. In this regard, more than one distinctive indicator can be perceived.

Furthermore, each indicator pair of the array of graphic indications 120 can be associated with a color code such that each indicator pair can be associated with a color which can be visually perceived. For example, the first, second, third, fourth, fifth and sixth indication pairs 120a/120b/120c/120d/120e/120f can be colored red, blue, green, yellow, purple and orange, respectively.

Each graphic indication pair of the array of graphic indications 120 can be graphically represented via a shape, as shown in FIG. 1a. For improvement of aesthetic appearance, each graphic indication pair of the array of graphic indications 120 can also be graphically represented via cartoon characters 190, as shown in FIG. 1b.

The coded graphic representation 110 can be useful for various applications. Examples of applications include information coding and education. Other applications such as entertainment and marketing can also be useful.

In one exemplary application, the coded graphic representation 110 can be used in information coding. For example, each indication pair of the array of graphic indications 120 can correspond to unique data. Thus, information coding can be location based such that a location, corresponding to a row and a column in the coded graphic representation 110, can correspond to unique data. Furthermore, the aforementioned distinctive indicator can be associated with a particular location, such as a row and a column, in the coded graphic representation 110. Appreciably, the aforementioned distinctive indicator can thus correspond to unique data. Additionally, where each indicator pair of the array of graphic indications 120 is associated with a color code, information coding can be further based on color coding.

In this regard, information coding can be one or both of location based and color coding based. In this manner, an avenue for efficient information coding can be provided. Specifically, tedious identification of subtle distinguishing marks and the use of, for example, an original picture for referencing need not be necessary. Furthermore, it is appreciable that the combination of location based and color coding based information coding provides an avenue for sophisticated information coding such that attempts to compromise security of coded information can be impeded.

In another exemplary application, the coded graphic representation 110 can be used for educational purposes. For example, as shown in FIG. 2a, the coded graphical representation can be recorded on a recording medium such as a game card 200 having a front face 200a and a back face 200b. The front and back faces 200a/200b can oppose each other. The back and front faces 200b/200a are further shown in FIG. 2b and FIG. 2c respectively.

As shown in FIG. 2a, the coded graphic representation 110 can be rendered on the back face 200b of the game card 200. Thus the coded graphic representation 110 can, for example, be carried via the back face 200b of the game card 200.

Figure 2C:
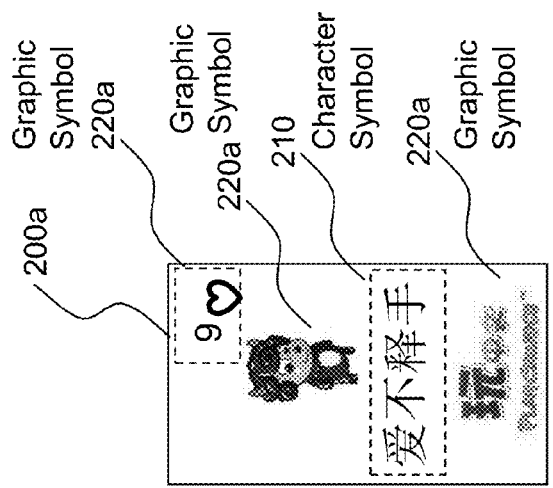
FIG. 2a to FIG. 2d show an exemplary application of the coded graphic representation of FIG. 1a, according to an embodiment of the disclosure.
Figure 2A:
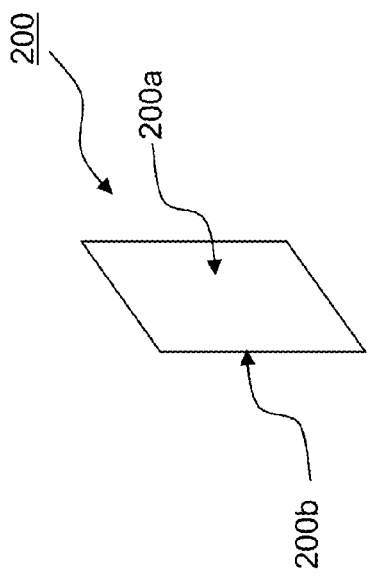
Figure 2B:
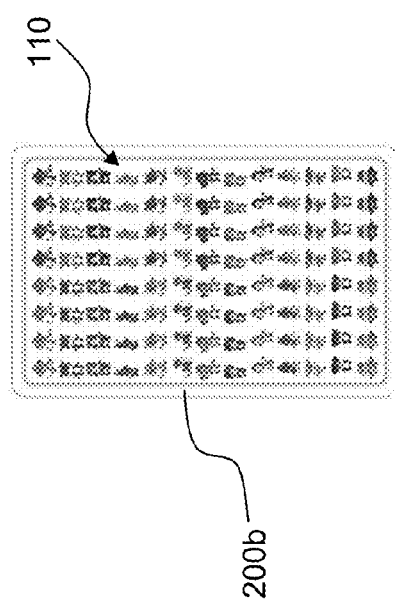

As shown in FIG. 2c, the front face 200a of the game card 200 can be provided with one or more character symbols 210 associated with one or more languages. As shown, the one or more character symbols 210 can be, for example, a string of Chinese character symbols corresponding to 爱不释手 Additionally, the front face 200a of the game card 200 can be further provided with one or more graphic symbols 220a. The graphic symbols 220a can be for enhancing aesthetic appearance of the game card 200.

A plurality of cards each having a front face and a back face analogous to the aforementioned game card 200 can similarly be produced in the manner described above, thus forming a deck of cards (not shown).

A card in the deck of cards can be associated with a set of character symbols which can correspond to an idiom. Preferably, each card in the deck of cards can be associated with a unique idiom. Furthermore, each card in the deck of cards can have a distinctive indicator which is based on one or both of a different location and a different color as compared with another card in the deck of cards. In this regard, each card in the deck of cards can be associated with a unique distinctive indicator which is associated with a unique idiom. Thus a unique idiom associated with a card can be identified based on one or both of location and color of a unique distinctive indicator associated with the card. In this regard, the foregoing pertaining to location based information coding and color coding based information coding analogously applies.

Thus, a student can, for example, memorize the unique idiom associated with each card in the deck of cards as well as one or both of the location and color coding of the distinctive indicator in association thereto. When shown the back face of a card from the deck, the student can thus recite the unique idiom based on the unique distinctive indicator identified. In this regard, the student can be trained in various personal development facets such as language recitation, memory and observation, which may aid in educational development.

Figure 2D:
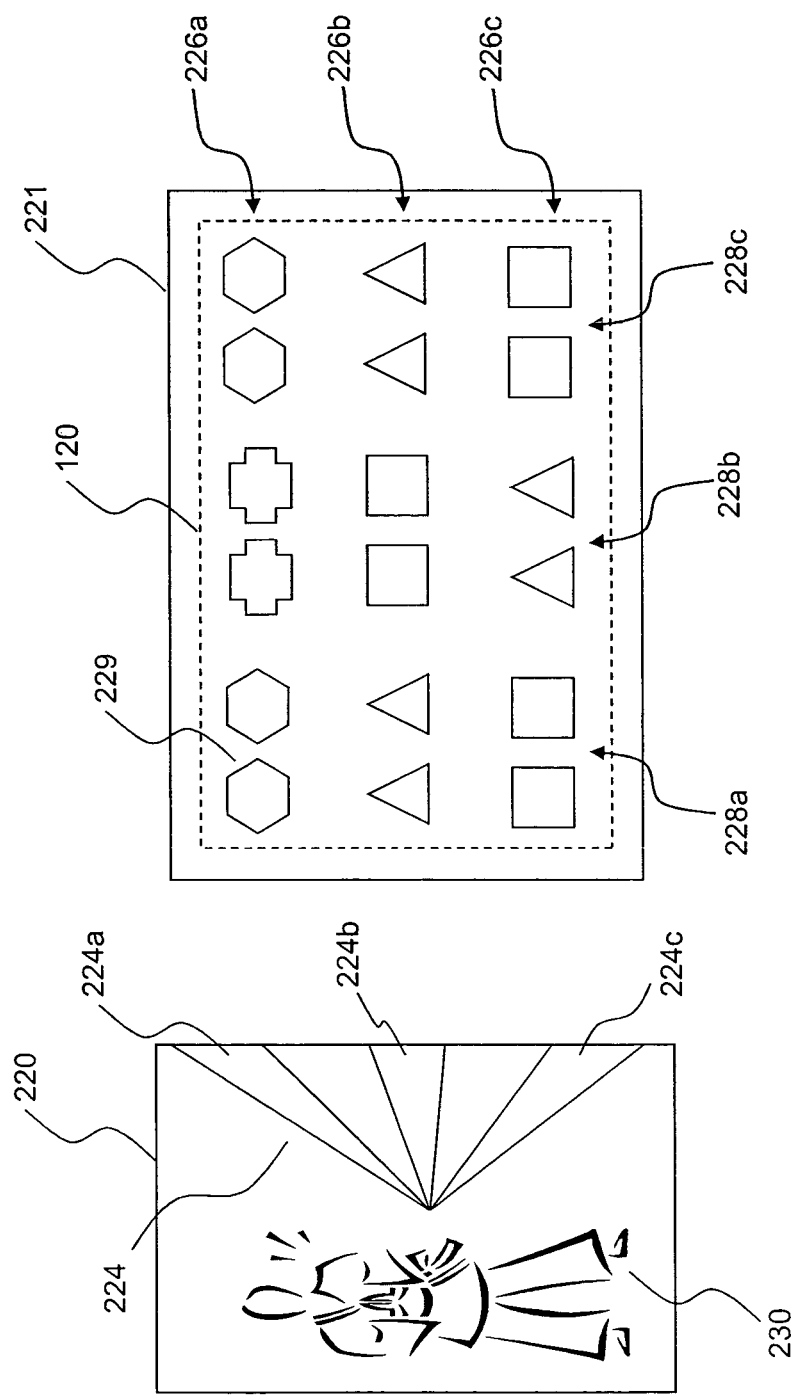

Referring to FIG. 2d, the aforementioned deck of cards can optionally include one or more cue cards 220. FIG. 2d also shows an exemplary card 221 from the aforementioned deck of cards which can, for example, carry the array of graphic indications 120.

A cue card 220 can, for example, correspond to a color code associated with an indication pair of the array of graphic indications 120. The cue card 220 can include a plurality of regions 224 corresponding to the array of graphic indications 120 carried by the exemplary card 221.

For example, as shown, the card 221 can carry an array of graphic indications 120 which can include a plurality of graphic indication pairs presented in a three by three array having a first row 226a, a second row 226b and a third row 226c, a first column 228a, a second column 228b and a third column 228c. Therefore, the plurality of regions 224 can, for example, include a first region 224a, a second region 224b and a third region 224c corresponding to, for example, the first, second and third rows 226a/226b/226c respectively.

Each of the first to third regions 224a/224b/224c, can for example, include inscriptions (not shown) which may correspond to the aforementioned unique idiom or inscriptions which may provide hints indicative of the aforementioned unique idiom. For example, where a student identifies a distinctive indicator based on an identified indicator pair 229 having a red color code and which is located at the first row 226a, the student may refer to a cue card 220, which corresponds to the red color code of the identified indicator pair 229, at its the first region 224a for a hint indicative of the unique idiom. Additionally, the cue card 220 may further include an amusement FIG. 230 for improving the aesthetic appearance of the cue card 220.

Figure 3A:
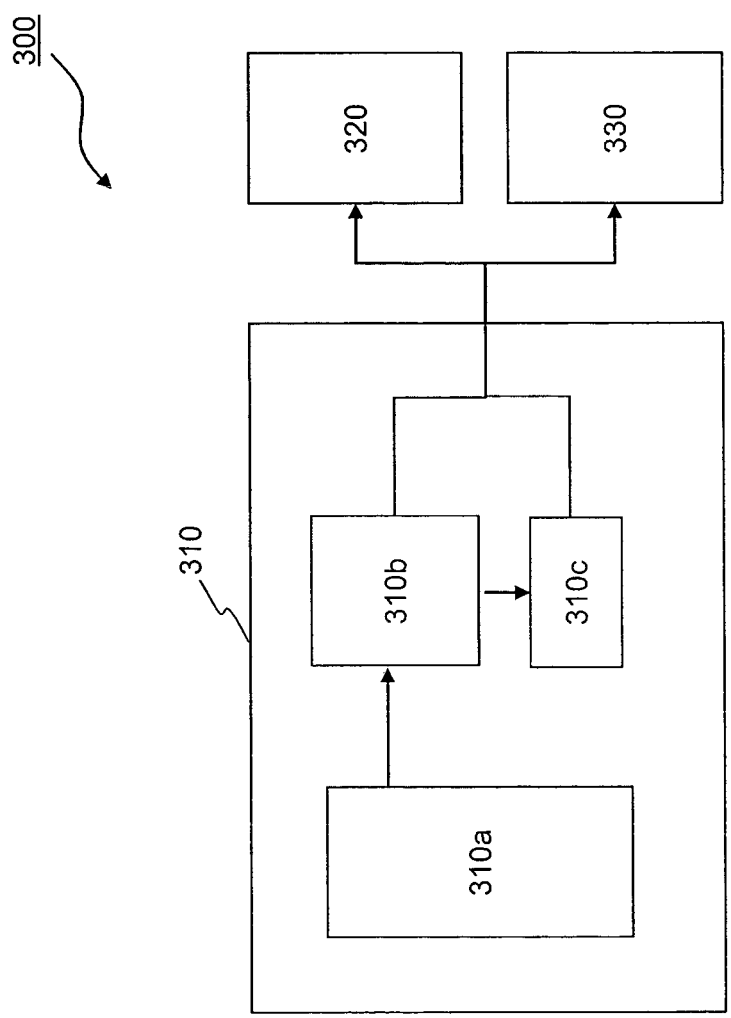
FIG. 3a shows a system in association with the coded graphic representation of FIG. 1a, in accordance with an embodiment of the disclosure.

A system 300, in association with the coded graphic representation 110, is shown in FIG. 3a, in accordance with an embodiment of the disclosure.

The system 300 includes an apparatus 310 which can be configured for producing the coded graphic representation 110. The system 300 can further include an output portion 320. The system 300 can yet further include a display portion 330 configurable for displaying the coded graphic representation 110. The apparatus 310 can be coupled to one or both of the output portion 320 and the display portion 330.

The apparatus 310 can include an input portion 310a and a processing portion 310b. The apparatus 310 can further include a storage medium 310c. One or both of the input portion 310a and the storage medium 310c can be coupled to the processing portion 310b.

The input portion 310a can be operated in a manner so as to communicate input signals to the processing portion 310b. The processing portion 310b can be configured to receive and process the input signals in a manner so as to produce graphic signals corresponding to the coded graphic representation 110.

The storage medium 310c can be configured to receive the graphic signals for recording or storage therein. In this regard, the storage medium 310c can correspond to the aforementioned recording medium 115 and the graphic signals can correspond to the aforementioned digital data. Graphic signals stored in the storage medium 310c can be further communicated as stored signals from the storage medium 310c.

The output portion 320 can be configured to receive and process one or both of the graphic signals and the stored signals in a manner so as to render the coded graphic representation 110 in a non-digitized manner. The output portion 320 can, for example, be a printer which upon receiving, for example, graphic signals from the processing portion 310b, renders the coded graphic representation 110 in a printed form on a printing material such as the aforementioned game card 200. In this regard, the printing material can correspond to the aforementioned recording medium 115.

The display portion 330 can be configured to receive and process one or both of the graphic signals and the stored signals in a manner so as to render the coded graphic representation 110 in a digitized manner. The display portion 330 can, for example, be a display screen which upon receiving, for example, graphic signals from the processing portion 310b, displays graphic data corresponding to the graphic signals, thereby rendering the coded graphic representation 110 in a digitized manner.

In one embodiment, the graphic signals can be communicated from the processing portion 310b to one or both of the output portion 320 and the display portion 330.

In another embodiment, the graphic signals can be communicated from the processing portion 310b to at least one of the storage medium 310c, the output portion 320 and the display portion 330. The storage medium 310c can be configured to further communicate stored signals to at least one of the output portion 320 and the display portion 330.

In yet another embodiment, the graphic signals can be communicated from the processing portion 310b to the storage medium 310c for recording or storage therein. The storage medium 310c can be configured to further communicate stored signals to at least one of the output portion 320 and the display portion 330.

As discussed above, the coded graphic representation 110 can be rendered either in a digitized manner or a non-digitized manner. Thus it is appreciable that the aforementioned deck of cards can analogously be rendered either in a digitized manner or a non-digitized manner via the system 300.

Figure 3B:
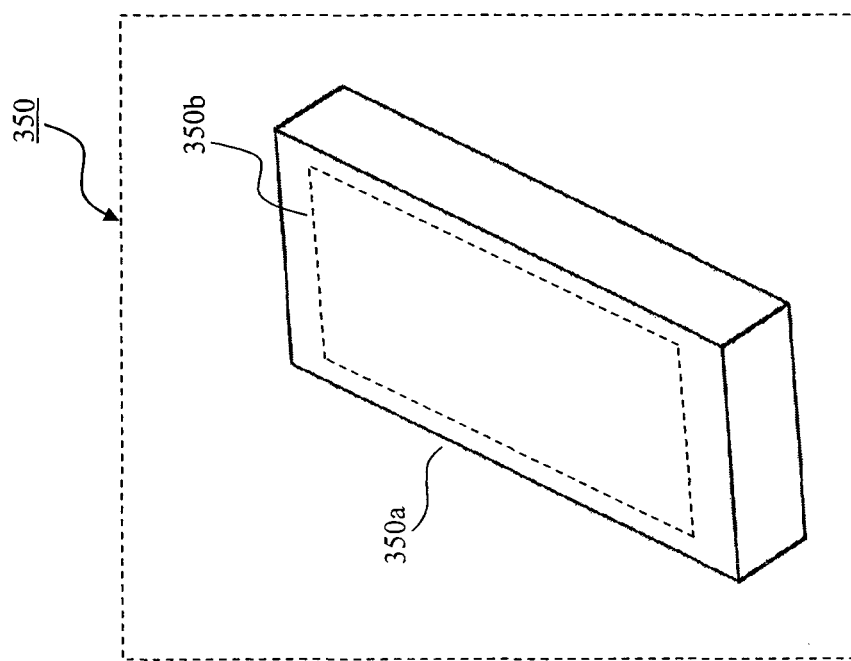
FIG. 3b shows an exemplary implementation of the system of FIG. 3a which can be configured to run an exemplary application, in accordance with an embodiment of the disclosure.

In one exemplary implementation, as shown in FIG. 3b, the system 300 can be an electronic device such as a tablet device 350. The tablet device 350 can be used by one or more users.

The tablet device 350 can include a housing 350a and a display screen 350b. The tablet device 350 can also include a processor (not shown) and a memory portion (not shown). The housing 350a can be shaped and dimensioned to carry the display screen 350b such that a user can view the display screen 350b. The housing 350a can be further shaped and dimensioned to accommodate the processor and the memory portion therewithin.

The display screen 350b can correspond to the display portion 330. The processor can correspond to the processing portion 310b. The memory portion can correspond to the storage medium 310c. In this regard, the foregoing pertaining to the display portion 330, the processing portion 310b and the storage medium 310c analogously applies. Additionally, the display screen 350b can be a touch screen based display. In this regard, the display screen 350b can further correspond to the input portion 310a. Thus the foregoing pertaining to the input portion 310a analogously applies.

The tablet device 350 can be configured to run an exemplary application 350c which is displayable via at least a portion of the display screen 350b. Specifically, the processor of the tablet device 350 can be configured in a manner so as to run the application 350c.

Figure 3C:
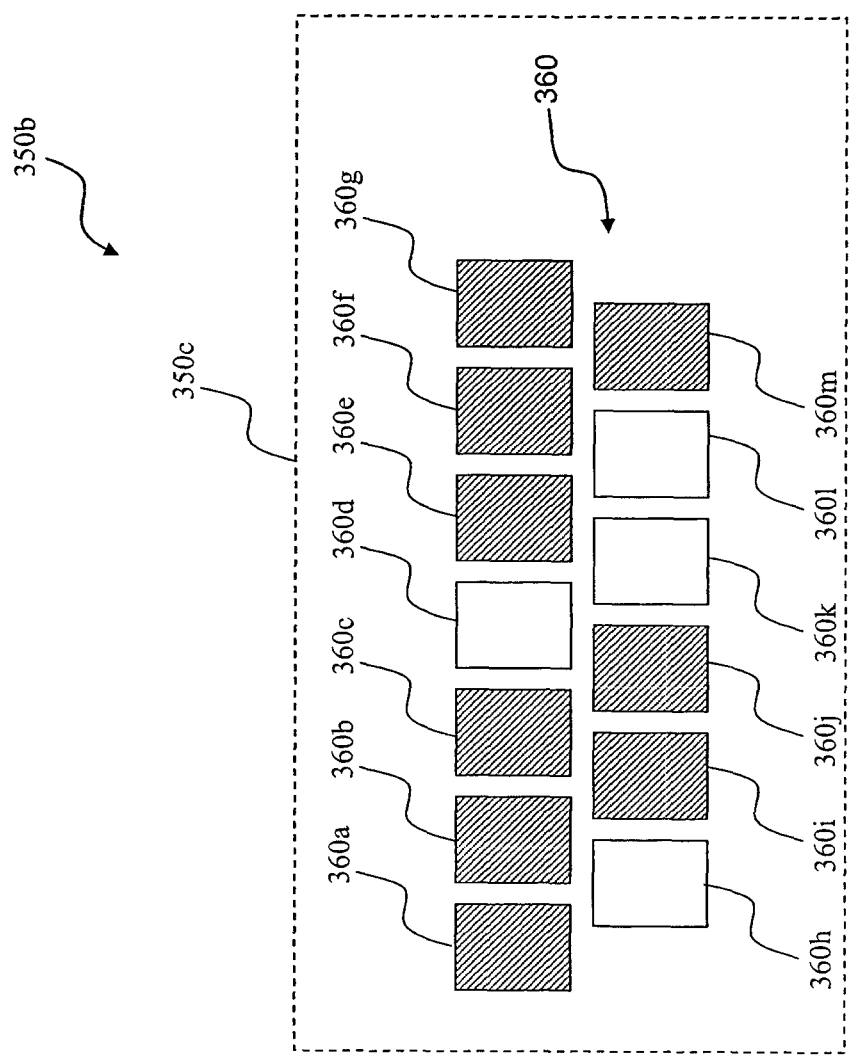
FIG. 3c shows the exemplary application of FIG. 3b in further detail, in accordance with an embodiment of the disclosure.

The exemplary application 350c is shown in further detail in FIG. 3c. The exemplary application 350c can include a plurality of placement portions 360. For example, as shown, the plurality of placement portions 360 can include a first placement portion to a thirteenth placement portion 360a/360b/360c/360d/360e/360f/360g/360h/360i/360j/360k/360l/360m.

A user can, via the display screen 350b, select a plurality of cards from the aforementioned deck of cards for placement at the plurality of placement portions 360. For example, thirteen cards from the aforementioned deck of cards can be selected for placement at the first to the thirteen placement portions 360a/360b/360c/360d/360e/360f/360g/360h/360i/360j/360k/360l/360m.

More specifically, a card from the thirteen selected cards can be placed at a placement portion from the first to the thirteen placement portions 360a/360b/360c/360d/360e/360f/360g/360h/360i/360j/360k/360l/360m.

As mentioned earlier with respect to the game card 200, each of the plurality of cards can include the front face 200a which can be provided with one or more character symbols 210 associated with one or more languages. The one or more character symbols 210 can be, for example, a string of Chinese character symbols. Additionally, the front face 200a can be further provided with one or more graphic symbols 220a. Moreover, the front face 200a can be associated with a color code. The color code can be a background color of the front face 200a.

The one or more graphic symbols 220a can be representative of the one or more character symbols 210. Specifically, a graphic symbol of the one or more graphic symbols 220a can be representative of at least one character symbol from the one or more character symbols 210. For example, the graphic symbol can correspond to an animal symbol. A character symbol from the one or more character symbols 210 can, for example, correspond to 羊 which can generally be translated as goat/sheep in the English language. Thus the graphic symbol can correspond to an animal symbol such as a goat/sheep. Furthermore, another graphic symbol of the one or more graphic symbols 220a can, for example, correspond to one or both of a numerical indication (i.e., 0 to 9) and an alphabetic indication (i.e., A to Z or a to z). Yet furthermore, yet another graphic symbol of the one or more graphic symbols 220a can, for example, correspond to a shape associated with a suit of a deck of playing cards. Specifically, a shape can, for example, correspond to hearts, spades, clubs or diamonds.

In one exemplary scenario, the front face 200a of each card in the plurality of cards can be provided with a graphic symbol corresponding to an animal symbol or a fictitious animal symbol.

For example, a graphic symbol of a card placed at the first placement portion 360a can correspond to an animal symbol such as a rat. A graphic symbol of a card placed at the second placement portion 360b can correspond to an animal symbol such as a cow. A graphic symbol of a card placed at the third placement portion 360c can correspond, to an animal symbol such as a tiger. A graphic symbol of a card placed at the fourth placement portion 360d can correspond to an animal symbol such as a rabbit. A graphic symbol of a card placed at the fifth placement portion 360e can correspond to a fictitious animal symbol such as a dragon. A graphic symbol of a card placed at the sixth placement portion 360f can correspond to an animal symbol such as a snake. A graphic symbol of a card placed at the seventh placement portion 360g can correspond to an animal symbol such as a horse. A graphic symbol of a card placed at the eighth placement portion 360h can correspond to an animal symbol such as a sheep. A graphic symbol of a card placed at the ninth placement portion 360i can correspond to an animal symbol such as a monkey. A graphic symbol of a card placed at the tenth placement portion 360j can correspond to an animal symbol such as a rooster. A graphic symbol of a card placed at the eleventh placement portion 360k can correspond to an animal symbol such as a dog. A graphic symbol of a card placed at the twelfth placement portion 360l can correspond to an animal symbol such as a pig. A graphic symbol of a card placed at the thirteenth placement portion 360m can correspond to a fictitious animal symbol such as a caped pig.

A user can select a card from the plurality of cards having a first string of Chinese character symbols corresponding to 兔 羊 猪 The selected card can have a second string of Chinese character symbols corresponding to 爱不释手 The selected card can further include a graphic symbol corresponding to an alphabetic/numeric indication such as the alphabet "A"/numeric "1". The selected card can yet further include another graphic symbol corresponding to a shape such as spades.

In this regard, it is appreciable that the first string of Chinese character symbols corresponding to 兔 羊 猪 the graphic symbol corresponding to an alphabetic/numeric indication such as the alphabet "A"/numeric "1", the graphic symbol corresponding to a shape such as spades and the color code associated with the front face 200a, or any combination thereof, can be uniquely associated with the a second string of Chinese character symbols corresponding to 爱不释手 Additionally, the Chinese character symbols "兔" "羊" and 猪 can generally be translated, respectively, as rabbit, goat/sheep and pig in the English language.

Based on the above mentioned selected card, thirteen cards from the aforementioned deck of cards can be selected for placement at the first to the thirteen placement portions 360a/360b/360c/360d/360e/360f/360g/360h/360i/360j/360k/360l/360m in an arrangement manner as will be described in further detail hereinafter.

Specifically, based on the Chinese character symbols "兔" "羊" and 猪 the card placed at the fourth placement portion 360*d* which has a graphic symbol corresponding to an animal symbol such as a rabbit can be positioned such that the front face 200*a* is visible to the user. Additionally, the card placed at the eighth placement portion 360*h* which has a graphic symbol corresponding to an animal symbol such as a sheep can be positioned such that the front face 200*a* is visible to the user. Furthermore, the card placed at the twelfth placement portion 360*l* which has a graphic symbol corresponding to an animal symbol such as a pig can be positioned such that the front face 200*a* is visible to the user.

Yet furthermore, one more card placed at any of the remaining first to third placement portions 360*a*/360*b*/360*c*, fifth to seventh placement portions 360*e*/360*f*/360*g*, ninth to eleventh placement portions 360*i*/360*j*/360*k* and thirteenth placement portion 360*m* can optionally be positioned such that the front face 200*a* is visible to the user. For example, in addition to the cards placed at the fourth, eighth and twelfth placement portions 360*d*/360*h*/360*l* being positioned such that each of their front faces 200*a* is visible to the user, an additional card which is placed at the eleventh placement portion 360*k* can optionally be positioned such that its front face 200*a* is visible to the user. The card placed at the eleventh placement portion 360*k* can have a graphic symbol corresponding to an animal symbol such as a dog (which can generally be represented by Chinese character symbol 狗. The cards placed at remaining placement positions 360*a*/360*b*/360*c*360*e*/360*f*/360*g*/360*i*/360*j*/360*m* can each be positioned such that the back face 200*b* is visible to the user.

It is appreciable that the card placed at the eleventh placement portion 360*k*, if positioned such that the front face 200*a* is visible to the user, can be considered a spurious input, since its graphic symbol does not correspond to the above mentioned selected card which has a first string of Chinese character symbols corresponding to 兔 羊 猪

Figure 3D:
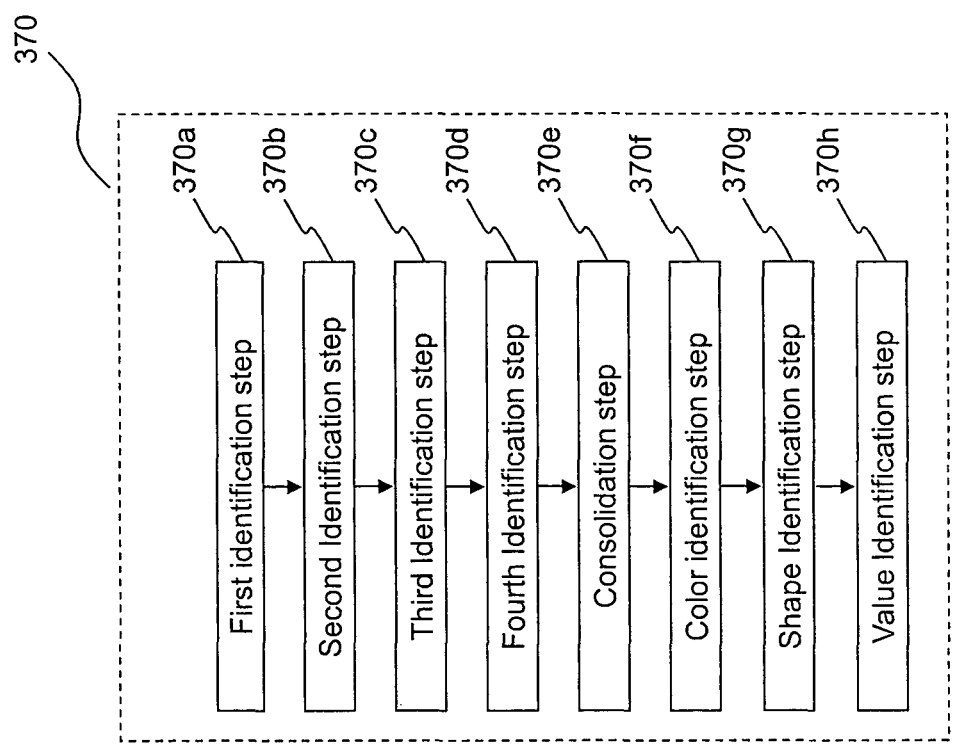
FIG. 3d shows an identification method which can be implemented in association with the exemplary application of FIG. 3c, in accordance with an embodiment of the disclosure.

After the thirteen cards from the aforementioned deck of cards are placed at the first to the thirteen placement portions 360*a*/360*b*/360*c*/360*d*/360*e*/360*f*/360*g*/360*h*/360*i*/360*j*/360*k*/360*l*/360*m* based on the above discussed arrangement manner, an identification method 370, as shown in FIG. 3*d*, having a series of identification steps can be performed by, for example, another user, to identify the spurious input.

The identification method 370 includes a first identification step 370*a* where the number of cards placed at the first, third, fifth, seventh, ninth and eleventh placement portions 360*a*/360*c*/360*e*/360*g*/360*i*/360*k* which front faces 200*a* can be visible to the user is identified. If the number of cards identified is an odd number, the first identification step 370*a* can be associated with a first indicator such as a numeric indicator "1". If the number of cards identified is an even number, the first identification step 370*a* can be associated with a second indicator such as a numeric indicator "0".

For example, based on the above discussed exemplary scenario where out of the cards placed at the first, third, fifth, seventh, ninth and eleventh placement portions 360*a*/360*c*/360*e*/360*g*/360*i*/360*k*, only the front face 200*a* of the card placed at the eleventh placement portion 360*k* is visible to the user, only one card can be identified. Thus the number of cards identified is an odd number. In this regard, the first identification step 370*a* can be associated with the first indicator (e.g., numeric indicator "1").

The identification method 370 includes a second identification step 370*b* where the number of cards placed at the second, third, sixth, seventh, tenth and eleventh placement portions 360*b*/360*c*/360*f*/360*g*/360*j*/360*k* which front faces 200*a* can be visible to the user is identified. If the number of cards identified is an odd number, the second identification step 370*b* can be associated with a third indicator such as numeric indicator "2". If the number of cards identified is an even number, the second identification step 370*b* can be associated with a fourth indicator such as numeric indicator "0".

For example, based on the above discussed exemplary scenario where out of the cards placed at the second, third, sixth, seventh, tenth and eleventh placement portions 360*b*/360*c*/360*f*/360*g*/360*j*/360*k*, only the front face 200*a* of the card placed at the eleventh placement portion 360*k* is visible to the user, only one card can be identified. Thus the number of cards identified is an odd number. In this regard, the second identification step 370*b* can be associated with the third indicator (e.g. numeric indicator "2").

The identification method 370 includes a third identification step 370*c* where the number of cards placed at the fourth, fifth, sixth, seventh, twelfth and thirteenth placement portions 360*d*/360*e*/360*f*/360*g*/360*l*/360*m* which front faces 200*a* can be visible to the user is identified. If the number of cards identified is an odd number, the third identification step 370*c* can be associated with a fifth indicator such as a numeric indicator "4". If the number of cards identified is an even number, the third identification step 370*c* can be associated with a sixth indicator such as a numeric indicator "0".

For example, based on the above discussed exemplary scenario where out of the cards placed at the fourth, fifth, sixth, seventh, twelfth and thirteenth placement portions 360*d*/360*e*/360*f*/360*g*/360*l*/360*m*, only the front face 200*a* of the cards, placed at the fourth and twelfth placement portions 360*d*/360*l* are visible to the user, two cards can be identified. Thus the number of cards identified is an even number. In this regard, the third identification step 370*c* can be associated with the sixth indicator (e.g., a numeric indicator "0").

The identification method 370 includes a fourth identification step 370*d* where the number of cards placed at the eighth, ninth, tenth, eleventh, twelfth and thirteenth placement portions 360*h*/360*i*/360*j*/360*k*/360*l*/360*m* which front faces 200*a* can be visible to the user is identified. If the number of cards identified is an odd number, the fourth identification step 370*d* can be associated with a seventh indicator such as a numeric indicator "8". If the number of cards identified is an even number, the fourth identification step 370*d* can be associated with an eighth indicator such as a numeric indicator "0".

For example, based on the above discussed exemplary scenario where out of the cards placed at the eighth, ninth, tenth, eleventh, twelfth and thirteenth placement portions 360*h*/360*i*/360*j*/360*k*/360*l*/360*m*, only the front face 200*a* of the cards placed at the eighth, eleventh and twelfth placement portions 360*h*/360*k*/360*l* are visible to the user, three cards can be identified. Thus the number of cards identified is an odd number. In this regard, the fourth identification step 370*d* can be associated with the seventh indicator (e.g., a numeric number "8").

The identification method 370 includes a consolidation step 370*e*, where based on processing of one of the first and second indicators of the first identification step 370*a*, one of the third and fourth indicators of the second identification step 370*b*, one of the fifth and sixth indicators of the third identification step 370*c* and one of the seventh and eighth indicators of the fourth identification step 370*d*, the spurious input, if any, can be identified.

For example, based on the above discussed exemplary scenario where the first identification step 370*a* can be associated with the first indicator (e.g., numeric indicator "1"), the second identification step 370*b* can be associated with the third indicator (e.g. numeric indicator "2"), the third identification step 370*c* can be associated with the sixth indicator (e.g., numeric indicator "0") and the fourth identification step 370*b* can be associated with the seventh indicator (e.g., numeric number "8"), processing at the consolidation step 370*e* can be in a manner such that the first, third, sixth and seventh indicators are summed to produce an indication result. Specifically, the indication result can be the summation of numeric indicator "1", numeric indicator "2", numeric indicator "0" and numeric indicator "8". In this regard, the indication result can correspond to numeric indicator "11".

Appreciably, the numeric indicator "11" of the indication result at the consolidation step 370*e* corresponds to the card placed at the eleventh placement portion 360*k* which can be considered as the spurious input when it is positioned such that the front face 200*a* is visible to the user.

Also appreciably, based on the identification method 370, when there is no spurious input, the first identification step 370*a* can be associated with the second indicator (e.g., numeric indicator "0"), the second identification step 370*b* can be associated with the fourth indicator (e.g. numeric indicator "0"), the third identification step 370*c* can be associated with the sixth indicator (e.g., numeric indicator "0") and the fourth identification step 370*b* can be associated with the eighth indicator (e.g., numeric number "0"), processing at the consolidation step 370*e* can be in a manner such that the second, fourth, sixth and eighth indicators are summed to produce an indication result. Specifically, the indication result can be the summation of numeric indicator "0", numeric indicator "0", numeric indicator "0" and numeric indicator "0". In this regard, the indication result can correspond to numeric indicator "0" which can be an indication that there is no spurious input.

As mentioned above, the identification method 370 can include a series of identification steps for identifying the spurious input. The identification method 370 can further include a color identification step 370*f* where the aforementioned color code associated with the front face 200*a* can be identified. More specifically, color code associated with the front face 200*a* of the aforementioned selected card can be identified.

For example, the front face 200*a* of each card of the plurality of cards can be associated with one of a first color code, a second color code, a third color code and a fourth color code. Thus the front face 200*a* of the aforementioned selected card can be associated with one of the first, second, third and fourth color codes.

At the color identification step 370*f*, the cards placed at the third and fifth placement portions 360*c*/360*e* can be indicative of the color code associated with the front face 200*a*.

In one example, if the back face 200*b* of each of the cards placed at the third and fifth placement portions 360*c*/360*e* can be visible to the user, the color code associated with the front face 200*a* of the aforementioned selected card can correspond to the first color code.

In another example, if the front faces 200*a* of each of the cards placed at the third and fifth placement portions 360*c*/360*e* can be visible to the user, the color code associated with the front face 200*a* of the aforementioned selected card can correspond to the second color code.

In yet another example, if the back face 200*b* the card placed at the third placement portion 360*c* and the front face 200*a* of the card placed at the fifth placement portion 360*e* can be visible to the user, the color code associated with the front face 200*a* of the aforementioned selected card can correspond to the third color code.

In yet a further example, if the front face 200*a* the card placed at the third placement portion 360*c* and the back face 200*b* of the card placed at the fifth placement portion 360*e* can be visible to the user, the color code associated with the front face 200*a* of the aforementioned selected card can correspond to the fourth color code.

Further as mentioned above, the identification method 370 can include a series of identification steps for identifying the spurious input. The identification method 370 can yet further include a shape identification step 370*g* where a shape to which a graphic symbol 220*a*, provided at the front face 200*a*, corresponds can be identified. More specifically, a shape to which a graphic symbol 220*a*, provided at the front face 200*a* of the aforementioned selected card, corresponds can be identified.

For example, a graphic symbol 220*a* provided at the front face 200*a* of each card of the plurality of cards can be associated with one of a first shape, a second shape, a third shape and a fourth shape. Thus a graphic symbol 220*a* provided at the front face 200*a* of the aforementioned selected card can be associated with one of the first, second, third and fourth shapes. Examples of each of the first to fourth shapes can include any of the aforementioned hearts, spades, clubs or diamonds.

At the shape identification step 370*g*, the cards placed at the sixth and seventh placement portions 360*f*/360*g* can be indicative of the shape associated with a graphic symbol 220*a* provided at the front face 200*a*.

In one example, if the back face 200*b* of each of the cards placed at the sixth and seventh placement portions 360*f*/360*g* can be visible to the user, the shape associated with a graphic symbol 220*a* provided at the front face 200*a* of the aforementioned selected card can correspond to the first shape.

In another example, if the front face 200*a* of each of the cards placed at the sixth and seventh placement portions 360*f*/360*g* can be visible to the user, the shape associated with a graphic symbol 220*a* provided at the front face 200*a* of the aforementioned selected card can correspond to the second shape.

In yet another example, if the back face 200*b* of the card placed at the sixth placement portion 360*f* and the front face 200*a* of the card placed at the seventh placement portion 360*g* can be visible to the user, the shape associated with a graphic symbol 220*a* provided at the front face 200*a* of the aforementioned selected card can correspond to the third shape.

In yet a further example, if the front face 200*a* of the card placed at the sixth placement portion 360*f* and the back face 200*b* of the card placed at the seventh placement portion 360*g* can be visible to the user, the shape associated with a graphic symbol 220*a* provided at the front face 200*a* of the aforementioned selected card can correspond to the fourth shape.

Yet further as mentioned above, the identification method 370 can include a series of identification steps for identifying the spurious input. The identification method 370 can yet further include a value identification step 370*h* where one or both of the aforementioned numerical indication (i.e., 0 to 9) and alphabetic indication (i.e., A to Z or a to z) can be identified. More specifically, one or both of the aforementioned numerical indication (i.e., 0 to 9) and alphabetic indication (i.e., A to Z or a to z) provided at the front face 200*a* of the aforementioned selected card can be identified.

At the value identification step 370*h*, the cards placed at the ninth, tenth, eleventh and twelfth placement portions 360*i*/360*j*/360*k*/360*l* can be indicative of one or both of the aforementioned numerical indication and alphabetic indication. Specifically, the cards placed at the ninth to twelfth placement portions 360*i*/360*j*/360*k*/360*l* can be associated with a first identifier, a second identifier, a third identifier and a fourth identifier respectively.

Each of the first to fourth identifiers can be associated with a first numeric indicator and a second numeric indicator. If the front face 200*a* of a card placed at any of the ninth, tenth, eleventh and twelfth placement portions 360*i*/360*j*/360*k*/360*l* is visible, the corresponding first to fourth identifiers can be associated with the first numeric indicator. Otherwise, if the back face 200*b* of a card placed at any of the ninth, tenth, eleventh and twelfth placement portions 360*i*/360*j*/360*k*/360*l* is visible, the corresponding first to fourth identifiers can be associated with the second numeric indicator. The first to fourth identifiers can be processed via, for example, summation so as to produce a resultant identifier. The resultant identifier can be indicative of one or both of the aforementioned numerical indication and alphabetic indication.

For example, the first identifier can be associated with a first numeric indicator "8" and a second numeric indicator "0". The second identifier can be associated with a first numeric indicator "4" and a second numeric indicator "0". The third identifier can be associated with a first numeric indicator "2" and a second numeric indicator "0". The fourth identifier can be associated with a first numeric indicator "1" and a second numeric indicator "0"

For example, where the cards placed at the ninth, tenth, eleventh and twelfth placement portions 360*i*/360*j*/360*k*/360*l* are such that the back face 200*b* of each of the cards placed at the ninth, tenth and eleventh placement portions 360*i*/360*j*/360*k* is visible and the front face 200*a* of the card placed at the twelfth placement portion 360*l* is visible, the first, second, third and fourth identifiers can be associated with the second numeric indicator, the second numeric indicator, the second numeric indicator and the first numeric indicator respectively. The resultant identifier can thus correspond to a numeric indicator "1" (i.e., 0+0+0+1).

Furthermore, it is appreciable that an association between a number and an alphabet can be made such that a number can correspond to an alphabet. For example an association can be made such that the alphabet "A" corresponds to the number "1". In this regard, where the resultant identifier corresponds to a numeric indicator "1" as discussed above, the resultant identifier can correspondingly be indicative of the alphabet "A".

Based on the abovementioned identification method 370, via the cards placed at the first to the thirteen placement portions 360*a*/360*b*/360*c*/360*d*/360*e*/360*f*/360*g*/360*h*/360*i*/360*j*/360*k*/360*l*/360*m*, it is appreciable that an association to the second string of Chinese character symbols corresponding to, for example, 爱不释手 provided on the front face 200*a* of the aforementioned selected card can be made. As mentioned earlier, the first string of Chinese character symbols corresponding to 兔 羊 猪 the graphic symbol corresponding to an alphabetic/a numeric indication such as the alphabet "A"/the numeric "1", the graphic symbol corresponding to a shape such as spades and the color code associated with the front face 200*a*, or any combination thereof, can be uniquely associated with the a second string of Chinese character symbols.

The above mentioned identification method 370 can be performed via, for example, the processor of the tablet device 350.

Figure 4:
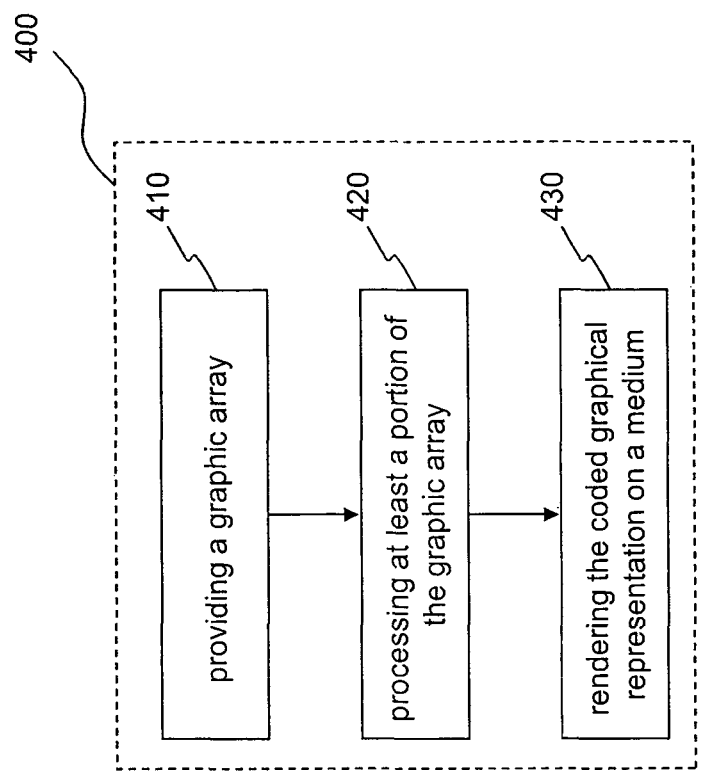
FIG. 4 is a flow diagram illustrating a method which can be implemented in association with the coded graphic representation of FIG. 1a, in accordance with another embodiment of the disclosure.

Referring to FIG. 4, a method 400, which can be implemented in association with the coded graphic representation 110, is shown, in accordance with an embodiment of the disclosure.

The method 400 can be suitable for producing the coded graphic representation 110. The method 400 can be further suitable for producing a recording medium 115 carrying the coded graphic representation 110.

The method 400 includes providing a graphic array 410. The method 400 can also include processing at least a portion of the graphic array 420 in a manner so as to produce the coded graphical representation 110. The method 400 can further include rendering the coded graphical representation on a medium 430.

Providing a graphic array 410 can include providing the array of graphic indications 120 which includes the plurality of graphic indication pairs. The plurality of graphic indication pairs can be spaced apart from each other in a manner such that graphic indication pairs in each of the one or more rows of the array of graphic indications 120 are spaced apart from each other at a separation distance corresponding to the first separation pitch 150*a*. Additionally, the plurality of graphic indication pairs can be spaced apart from each other in a manner such that graphic indication pairs in each of the one or more columns of the array of graphic indications 120 are spaced apart from each other at a separation distance corresponding to the second separation pitch 150*b*. Furthermore, each of the plurality of graphic indication pairs can be color coded.

Processing at least a portion of the graphic array 420 can include position shifting or displacing one or more graphic indication pairs relative to the remaining graphic indication pairs in the plurality of graphic indication pairs such that one or both of the first and second separation pitches 150*a*/150*b* can be deviated. One or both of the first and second separation pitches 150*a*/150*b* can be deviated in a manner such that there is a first and second pitch deviation 160*a*/160*b*. In this manner, the coded graphic representation 110 can be produced.

Rendering the coded graphical representation on a medium 430 can include recording or storing the coded graphic representation 110 on a recording medium 115. The coded graphical representation 110 can, for example, be rendered, via printing, on a printing material such as a card. The recording medium 115 can thus, for example, be a card which carries the coded graphic representation 110.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

The invention claimed is:

1. A method for producing a coded graphic representation usable in information coding, the method comprising:
   providing a graphic array such that an array of graphic indications which includes a plurality of graphic indication pairs is provided, each of the plurality of graphic indication pair having at least a first graphic element and a second graphic element, the first and second graphic elements being spaced apart such that each of the plurality of graphic indication pairs is associable with an element pitch, the element pitches of the plurality of graphic indication pairs being similar; and processing at least a portion of the graphic array by displacing at least one graphic indication pair in the plurality of graphic indication pairs such that at least one element pitch is deviated, wherein each graphic indication pair is associable with a location based on a row and a column in the coded graphic representation, wherein each graphic indication pair is associable with a color code, and wherein information coding is at least one of location based and color coding based.

2. The method as in claim 1, wherein the at least one element pitch is deviated such that the at least one element pitch is smaller compared to element pitches associated with remaining graphic indication pairs of the plurality of graphic indication pairs.

3. The method as in claim 1, wherein the at least one element pitch is deviated such that the at least one element pitch is larger compared to element pitches associated with remaining graphic indication pairs of the plurality of graphic indication pairs.

4. The method as in claim 1 wherein the plurality of graphic indication pairs are presentable in a manner such that the array of graphic indications is in a form of an array having at least one of:
   a plurality of rows, each of which having a plurality of graphic indication pairs; and
   a plurality of columns, each of which having a plurality of graphic indication pairs.

5. The method as in claim 4,
   wherein one graphic indication pair and another graphic indication pair of the plurality of graphic indication pairs in each of the plurality of rows are spaced apart such that separation of graphic indication pairs in each of the plurality of rows is associable with a first separation pitch, and
   wherein one graphic indication pair and another graphic indication pair of the plurality of graphic indication pairs in each of the plurality of columns are spaced apart such that separation of graphic indication pairs in each of the plurality of columns is associable with a second separation pitch.

6. The method as in claim 5, wherein at least graphic indication pair in at least one of the plurality of rows and the plurality of columns is position shifted in a manner such that at least one of the first and second separation pitches are deviated, deviation in at least one of the first and second separation pitches being associable with a first pitch deviation and a second pitch deviation.

7. The method as in claim 6, wherein the first separation pitch is associable with a separation distance such that a graphic indication pair in the plurality of indication pairs is spaced apart from another graphic indication pair in the plurality of indication pairs by the separation distance associable with the first separation pitch.

8. A non-transitory recording medium carrying a coded graphic representation usable in information coding, the coded graphic representation comprising:
   an array of graphic indications comprising a plurality of graphic indication pairs presentable in a manner such that the array of graphic indications is in a form of an array having at least one of:
      a plurality of rows, each of which having a plurality of graphic indication pairs; and
      a plurality of columns, each of which having a plurality of graphic indication pairs,
   wherein each of the plurality of graphic indication pairs comprises a first graphic element and a second graphic element, the first and second graphic elements being spaced apart such that each of the plurality of graphic indication pairs is associable with an element pitch, the element pitches of the plurality of graphic indication pairs being similar,
   wherein at least one graphic indication pair in the plurality of graphic indication pairs is displaced such that at least one element pitch is deviated,
   wherein each graphic indication pair is associable with a location based on a row and a column in the coded graphic representation,
   wherein each graphic indication pair is associable with a color code, and
   wherein information coding is at least one of location based and color coding based.

9. The recording medium as in claim 8,
   wherein one graphic indication pair and another graphic indication pair of the plurality of graphic indication pairs in each of the plurality of rows are spaced apart from each other such that separation of graphic indication pairs in each of the plurality of rows is associable with a first separation pitch, and
   wherein one graphic indication pair and another graphic indication pair of the plurality of graphic indication pairs in each of the plurality of columns are spaced apart such that separation of graphic indication pairs in each of the plurality of columns is associable with a second separation pitch.

10. The recording medium as in claim 9 wherein the first separation pitch is associable with a separation distance such that a graphic indication pair in the plurality of indication pairs is spaced apart from another graphic indication pair in the plurality of indication pairs by the separation distance associable with the first separation pitch.

11. The recording medium as in claim 10 wherein the second separation pitch is associable with a separation distance such that a graphic indication pair in the plurality of indication pairs is spaced apart from another graphic indication pair in the plurality of indication pairs by the separation distance associable with the second separation pitch.

12. The recording medium as in claim 8, wherein the at least one element pitch is deviated such that the at least one element pitch is smaller compared to element pitches associated with remaining graphic indication pairs of the plurality of graphic indication pairs.

13. The recording medium as in claim 8, wherein the at least one element pitch is deviated such that the at least one element pitch is larger compared to element pitches associated with remaining graphic indication pairs of the plurality of graphic indication pairs.

14. The recording medium as in claim 8 being a printing material on which the coded graphic representation is rendered.

15. The recording medium as in claim 8 being a digital storage medium capable of storing digital data corresponding to the coded graphic representation.

16. An apparatus for producing a coded graphic representation usable in information coding, the apparatus comprising
   an input operable in a manner so as to communicate input signals; and
   a processor coupled to the input, the processor being configurable to:

receive and process the input signals in a manner so as to produce graphic signals corresponding to the coded graphic representation, the coded graphic representation comprising:
an array of graphic indications comprising a plurality of graphic indication pairs presentable in a manner such that the array of graphic indications is in a form of an array having at least one of:
a plurality of rows, each of which having a plurality of graphic indication pairs; and
a plurality of columns, each of which having a plurality of graphic indication pairs,
wherein each of the plurality of graphic indication pairs comprises a first graphic element and a second graphic element, the first and second graphic elements being spaced apart such that each of the plurality of graphic indication pairs is associable with an element pitch, the element pitches of the plurality of graphic indication pairs being similar,
wherein the processing portion is further configurable to process the input signals in a manner such that at least one graphic indication pair in the plurality of graphic indication pairs is displaced such that at least one element pitch is deviated,
wherein each graphic indication pair is associable with a location based on a row and a column in the coded graphic representation,
wherein each graphic indication pair is associable with a color code, and
wherein information coding is at least one of location based and color coding based.

17. The apparatus as in claim 16,
wherein one graphic indication pair and another graphic indication pair of the plurality of graphic indication pairs in each of the plurality of rows are spaced apart such that separation of graphic indication pairs in each of the plurality of rows is associable with a first separation pitch, and
wherein one graphic indication pair and another graphic indication pair of the plurality of graphic indication pairs in each of the plurality of columns are spaced apart such that separation of graphic indication pairs in each of the plurality of columns is associable with a second separation pitch.

18. The apparatus as in claim 16, wherein the at least one element pitch is deviated such that the at least one element pitch is smaller compared to element pitches associated with remaining graphic indication pairs of the plurality of graphic indication pairs.

19. The apparatus as in claim 16, wherein the at least one element pitch is deviated such that the at least one element pitch is larger compared to element pitches associated with remaining graphic indication pairs of the plurality of graphic indication pairs.

20. The apparatus as in claim 16, wherein at least one element pitch is deviated by position shifting one of the first and second graphic elements.

* * * * *